UNITED STATES PATENT OFFICE.

EDWIN T. GREENFIELD AND JUNIUS NAGEL, OF NEW YORK, N. Y., ASSIGNORS, BY MESNE ASSIGNMENTS, TO THE INTERIOR CONDUIT AND INSULATION COMPANY.

PROCESS OF IMPREGNATING POROUS BODIES.

SPECIFICATION forming part of Letters Patent No. 441,839, dated December 2, 1890.

Application filed May 9, 1890. Serial No. 351,191. (No specimens.)

*To all whom it may concern:*

Be it known that we, EDWIN T. GREENFIELD, a citizen of the United States, and JUNIUS NAGEL, (who has declared his intention of becoming a citizen of the United States,) both residing in New York city, in the county and State of New York, have invented a new and useful Process of Impregnating Porous Bodies, of which the following is a specification.

Heretofore the treatment of organic bodies with a waterproofing material or other compound in a liquid state has been effected either by a surface coating applied to the material by a brush or similar method or by immersing the body in the compound. The latter method of treating such bodies with such material or compound, when the same was maintained in a liquid state below a temperature which would char them, was to immerse the bodies in the material or compound for an indefinite period. This method, however, did not result in thoroughly impregnating the organic body with the material or compound, as the temperature at which such material or compound was maintained was too low to properly liquefy the same, so that it would penetrate easily. If the compound is maintained at a temperature high enough to properly liquefy it, then great care is necessary to avoid charring or carbonizing the organic body. By immersing the organic body in the liquid material or compound once for a brief period, the immersion being quickly effected, charring is avoided; but the product resulting is not thoroughly impregnated.

In carrying out our process we employ a compound which is maintained at a high heat, so that it will be thoroughly liquefied, and which would, if the organic body to be treated were permitted to remain for any length of time in the molten compound, be charred or carbonized and thereby rendered valueless.

The main feature of our process is founded on the discovery, new to us, that to thoroughly impregnate organic fibrous, porous, or cellular bodies with a waterproofing material or similar compound, alternate immersions and rests in a bath of the impregnating material or compound maintained in a liquid condition by high heat avoids charring or carbonization of the said bodies while effecting a thorough impregnation of the body throughout its mass with the material or compound.

We will describe our process as carried out by using petroleum-pitch as the waterproofing material. This material, in order to effectively impregnate an organic body, is maintained in a liquid state by a heat of about 350° Fahrenheit constantly; but it may be worked at a temperature as low as 260° Fahrenheit; but the process then is slower. At either of these heats, if the organic bodies were permitted to remain for any length of time in the compound, they would be charred and thereby rendered useless. When the bodies to be treated have been dried, so that as much moisture as possible is expelled from them, they are immersed for a very short period in the impregnating compound. They are then raised and held out of said compound preferably for a period considerably longer than the duration of the immersion. Preferably the bodies undergoing treatment are raised above the impregnating compound into a cooler medium where the compound will become to some extent congealed. This first short immersion and comparatively long rest permits the impregnating-liquid to penetrate into the pores or fibers of the body undergoing treatment, and to some extent prepares it to remain a longer time in the liquid on the next immersion. The bodies are again immersed for a longer period than the first immersion, and are then withdrawn from the liquid and held out of the same for a shorter period than that succeeding the first immersion. This second immersion effects a further penetration of the impregnating material into the body undergoing treatment and further prepares it, so that on the next immersion it will without injury to it stand a still longer immersion than the second immersion, and so on for each succeeding immersion, until the bodies are thoroughly impregnated, the rests between immersions being preferably shorter as the immersions are longer.

In the treatment of such organic bodies as paper tubes we have found that for a tube of one-quarter-inch inside diameter with a thickness of wall of one-sixteenth inch the following periods of immersions and rests produce good results: For the first immersion, one-fourth of a minute, with a rest of two minutes; for the second immersion, one-half a minute, with a rest of one and three-fourths minute; for the third immersion, three-fourths minute, with a rest of one and one-half minute; for the fourth immersion, one minute, with a rest of one and one-fourth minute, and for the fifth immersion, one and one-fourth minute, when the tube may be taken out and allowed to cool.

So far as we are able to observe, the action which takes place in treating organic bodies as above described is as follows: The first rapid immersion results in a penetration of the impregnating material to some extent, and serves to drive out moisture and air. The subsequent rest, when effected in a cooler medium than the molten compound in the kettle, results in a change in the consistency of the impregnating compound and serves to prepare the bodies for the next immersion by exposing to the action of the impregnating material a compound somewhat congealed, which forms a superior heat-non-conducting envelope or jacket, thereby protecting the organic fibrous body from charring to a considerable extent. The subsequent immersions and rests in their action are similar to the first, as we have observed them, each immersion serving to drive in the compound taken up by the previous one. The result is a body which is penetrated throughout its mass by the impregnating compound, and not simply provided with successive coatings by the alternate immersions and rests.

Having now particularly described our invention, what we claim, and desire to secure by Letters Patent, is—

1. The process of treating an organic fibrous, porous, or cellular body, which consists in impregnating it with a suitable material or compound maintained in a liquid condition by heat by alternate immersions and rests, substantially as set forth.

2. The process of treating an organic fibrous, porous, or cellular body, which consists in impregnating it with a suitable material or compound maintained in a liquid condition by heat by alternate immersions and rests, the time of immersions and rests being varied in relation to one another, substantially as set forth.

3. The process of treating an organic fibrous, porous, or cellular body, which consists in impregnating it with a suitable material or compound maintained in a liquid condition by heat by alternate immersions and rests, the rests being effected in a medium cooler than the impregnating compound, substantially as set forth.

This specification signed and witnessed this 30th day of April, 1890.

EDWIN T. GREENFIELD.
JUNIUS NAGEL.

Witnesses:
W. PELZER,
NORRIS A. CLARK.